(12) United States Patent
Schlaikjer et al.

(10) Patent No.: US 7,709,158 B1
(45) Date of Patent: May 4, 2010

(54) GUANIDINE DERIVATIVES AS CATIONS FOR AMBIENT TEMPERATURE MOLTEN SALES IN ELECTROCHEMICAL POWER SOURCES

(75) Inventors: Carl R. Schlaikjer, Middleboro, MA (US); Michael F. Scalise, Clarence, NY (US)

(73) Assignee: Electrochem Solutions, Inc., Clarence, NY (US)

( * ) Notice: Subject to any disclaimer, the term of this patent is extended or adjusted under 35 U.S.C. 154(b) by 605 days.

(21) Appl. No.: 11/612,148

(22) Filed: Dec. 18, 2006

Related U.S. Application Data

(63) Continuation-in-part of application No. 10/435,224, filed on May 9, 2003, now abandoned.

(60) Provisional application No. 60/379,096, filed on May 9, 2002.

(51) Int. Cl.
  *H01M 6/16* (2006.01)
(52) U.S. Cl. ........................ 429/339; 429/188
(58) Field of Classification Search ........................ None
  See application file for complete search history.

(56) References Cited

U.S. PATENT DOCUMENTS

| 5,714,280 | A | 2/1998 | Nakano et al. |
| 6,365,068 | B1 | 4/2002 | Michot et al. |
| 6,841,299 | B2 * | 1/2005 | Wariishi ..................... 429/188 |

| 2001/0033971 | A1 | 10/2001 | Zhao et al. |
| 2002/0034685 | A1 * | 3/2002 | Sato et al. ................... 429/176 |

FOREIGN PATENT DOCUMENTS

| DE | 195 27 361 A1 | 2/1996 |
| EP | 09099749 | 4/1997 |

* cited by examiner

*Primary Examiner*—Patrick Ryan
*Assistant Examiner*—Cynthia Lee
(74) *Attorney, Agent, or Firm*—Michael F. Scalise

(57) ABSTRACT

The present invention is directed to ambient temperature molten salts as non-aqueous electrolytes. The molten salts comprise a cation of a guanidine moiety and an anion. The guanidine cation is asymmetrically halogenated, which means that in the general formula: $C(NR_2)_3^+$, one or two, but not all three, of the N atoms are bonded to R radicals that are the same for each thusly substituted N atom and the third N atom is bonded to hydrogen or two of the same R radicals, and if R radicals, they are different than the R radicals bonded to the first and second N atoms. The R radicals bonded to any one N atom is an alkyl group of from 1 to 4 carbon atoms. Either both of the hydrogen atoms or at least one of the hydrogen atoms on each of the R radicals bonded to one or two, but not three, of the N atoms are substituted with the same halogen selected from the group consisting of fluorine, chlorine, bromine, and iodine. Preferably the anion is partially or fully halogenated, and the halogen of the guanidinium cation and that of the anion are the same. The electrolyte is useful with electrochemical devices such as primary and secondary electrochemical cells and capacitors, such as of the electrolytic and electrolytic/electrochemical hybrid types.

20 Claims, No Drawings

GUANIDINE DERIVATIVES AS CATIONS FOR AMBIENT TEMPERATURE MOLTEN SALES IN ELECTROCHEMICAL POWER SOURCES

CROSS-REFERENCE TO RELATED APPLICATIONS

This application is a continuation-in-part of application Ser. No. 10/435,224, filed May 9, 2003, now abandoned, which claims priority from provisional application Ser. No. 60/379,096, filed May 9, 2002.

BACKGROUND OF THE INVENTION

1. Field of the Invention

This invention relates to electrochemical power sources such as cells, batteries and capacitors. More particularly, the present invention is directed to ambient temperature molten salts that are useful as electrolytes in primary and secondary electrochemical cells and in high energy density electrolytic capacitors. Additionally, such salts are useful as hydraulic fluids and fire retardants.

2. Prior Art

Examples of electrolytes currently being used in rechargeable electrochemical power sources include liquid, gel, and dry polymer types. Dry polymer electrolyte cells without plasticizers exist, but their inadequate conductivity and low lithium ion transference prevent them from being used at ambient or reduced temperatures.

Liquid and gel electrolytes have higher ionic conductivity and adequate lithium ion transference when compared with dry polymer electrolytes. An example is a solvent system of propylene carbonate and 1,2-dimethoxyethane having a lithium salt such as $LiPF_6$ or $LiAsF_6$ dissolved therein. Such an electrolyte is typically used to activate a lithium/silver vanadium oxide (Li/SVO) cell. Additionally, liquid and gel electrolyte cells, such as of a carbonaceous negative electrode and a lithium cobalt oxide positive electrode, are capable of cycling at relatively high rates and low temperatures. One major disadvantage with them, however, is that organic solvents must be included in the electrolyte to improve conductivity and, in the case of the liquid phase, lower viscosity. Liquid and gel electrolytes are also relatively volatile and flammable, which poses a risk of fire when they are heated. In addition, liquid and gel electrolyte cells, whether of a primary or a secondary chemistry, are subject to gassing and subsequent leakage. The packaging and processing required to prevent leakage is complex and, therefore, costly.

In contrast, electrolytes based on ambient temperature molten salts promise the safety of dry polymers along with substantially higher ionic conductivies. One example is described in U.S. Pat. No. 5,827,602 to Koch et al., which relates to derivatives of imidazole and the usefulness of these ambient temperature molten salts as electrolytes for high energy density batteries and capacitors. Pyridine and other five and six membered heterocyclic cations containing one or more nitrogen atoms are also discussed. For example, 1-methyl-3-ethyl-1H-imidazolium, which is shown below, forms molten salts at ambient temperature with several different anions.

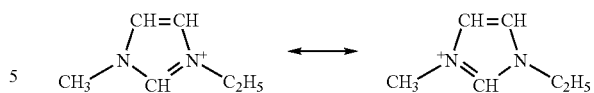

1-methyl-3-ethyl-1H-imidazolium cation

Delocalization of the positive charge on this five-membered heterocyclic ring is made possible by the two illustrated resonant hybrid cation structures. The resonant structures are believed to be one of the properties of such cations responsible for lowering the melting point of their derivative salts. The other reason such salts are molten at ambient temperatures is the asymmetry afforded by the difference in the aliphatic groups attached to the nitrogen atoms.

While derivative salts, such as those taught by Koch et al., are potentially useful as battery electrolytes, they are not without limitations. These include a narrow potential window, their propensity to become intercalated into graphite negative electrodes, and their need to be "blended" with organic solvents, such as carbonate esters, to improve conductivity and lower viscosity.

SUMMARY OF THE INVENTION

The present invention is directed to the use of a new ambient temperature molten salt as an electrolyte for electrochemical energy storage devices, such as electrochemical cells and electrolytic capacitors. The ambient temperature molten salt comprises a guanidine cation, particularly an asymmetrically substituted one, combined with an anion. In order to increase resistance to electrochemical oxidation and reduction, the substituent organic group is partially or totally halogenated, such as by fluorine. A particularly preferred anion is lithium bis-trifluoromethanesulfonyl imide.

The product molten salt is used in its liquid form, or is combined with a polymer to provide a gel electrolyte. Either type of nonaqueous electrolyte provides high conductivity in an electrochemical system without the use of volatile components. There is also no risk of fire if the cell or capacitor is overheated or overcharged, even in the absence of safety circuits. This improved safety is without loss in capacity, cycle life, or rate capability relative to the existing technology, such as the above-discussed Koch et al. electrolytes. Cells and capacitors of the present invention are also easier to manufacture and to package than cells and capacitors activated with conventional electrolytes.

These and other objects of the present invention will become increasingly more apparent to those skilled in the art by reference to the following description.

DETAILED DESCRIPTION OF THE PREFERRED EMBODIMENTS

Guanidine is a unique amine in which three nitrogen atoms are joined to the same carbon atom. As shown in the equation below, delocalization of the positive charge is possible over all three nitrogen atoms. Because of this guanidine is one of the strongest organic bases known.

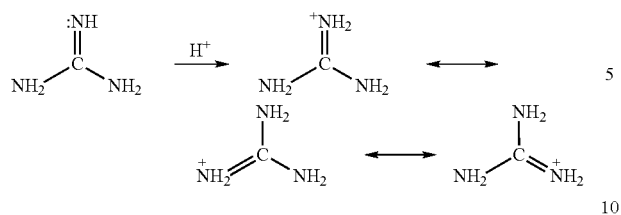

The resonant hybrid cation structures of guanidine are believed to be one of the properties responsible for lowering the melting point of its derivative salts. The other property believed to reduce the melting point of guanidine derivative salts is the asymmetry afforded by the difference in the aliphatic groups attached to each of the three nitrogen atoms. As shown below, a guanidinium cation has six possible positions:

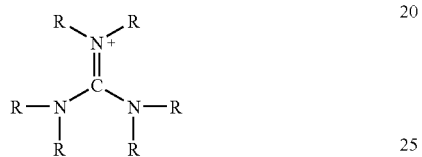

The "R" groups can be combinations of hydrogens and organic radicals, or just combinations of organic radicals. For example, tetramethylguanidine is an easily obtained liquid which has the following structure:

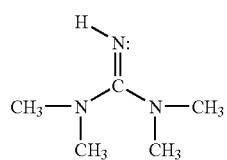

In aqueous solution in the presence of an acid such as hydrochloric acid, tetramethylguanidine is converted to tetramethylguanidinium chloride:

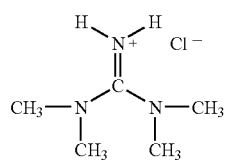

In order to increase the stability of the cation with respect to chemical or electrochemical reduction, it is advantageous to consider cases where all of the hydrogen atoms have been replaced by organic radicals. Examples of such fully substituted cations include:

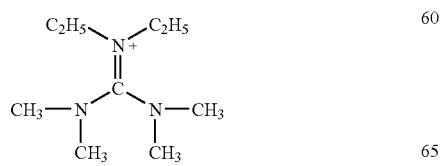

N,N,N',N'-tetramethyl-N",N"-diethylguanidinium

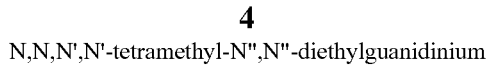

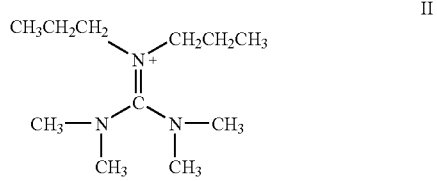

N,N,N',N'-tetramethyl-N",N"-di-n-propylguanidinium

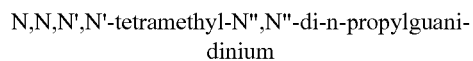

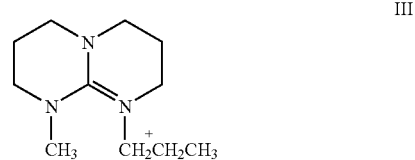

1-methyl-7-n-propyl-1,5,7-triazabicyclo[4.4.0]dec-5-enium

According to the present invention, asymmetrically halogenated guanidinium derivatives form exceptionally stable ambient temperature molten salts with a halogenated anion. An asymmetrically halogenated guanidinium cation has the general formula: $C(NR_2)_3^+$, wherein one or two, but not all three, of the N atoms are bonded to R radicals that are the same for each thusly substituted N atom and the third N atom is bonded to hydrogen or two of the same R radicals, and if R radicals, they are different than the R radicals bonded to the first and second N atoms. The R radicals bonded to any one N atom are an alkyl group of from 1 to 4 carbon atoms selected from the group consisting of ethyl, propyl, isopropyl, butyl, isobutyl, sec-butyl, and tert-butyl. Further, either both of the hydrogen atoms or at least one of the hydrogen atoms on each of the R radicals bonded to one or two, but not three, of the N atoms are substituted with the same halogen selected from the group consisting of fluorine, chlorine, bromine, and iodine.

Exemplary asymmetrically halogenated guanidinium derivatives include:

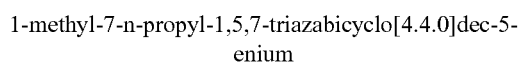

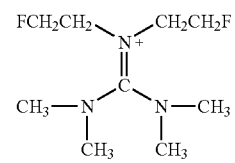

5
N,N,N',N'-tetramethyl-N",N"-di-2-fluoroethylguanidinium

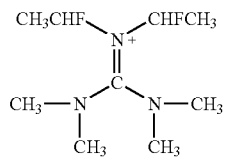

N,N,N',N'-tetramethyl-N",N"-di-1-fluoroethylguanidinium

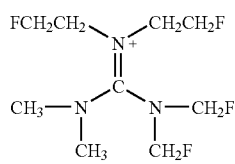

N,N-dimethyl-N',N'-difluoromethyl-N",N"-di-2-fluoroethylguanidinium

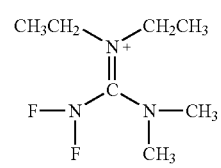

N,N-dimethyl-N',N'-difluoro-N",N"-diethylguanidinium

The guanidine cation can also be a halogenated heterocyclic compound. A few examples are given below:

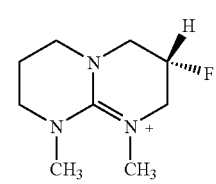

1,7-dimethyl-9-fluoro-1,5,7-triazabicyclo[4.4.0]dec-5-enium

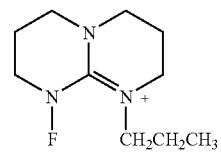

6
1-fluoro-7-n-propyl-1,5,7-triazabicyclo[4.4.0]dec-5-enium

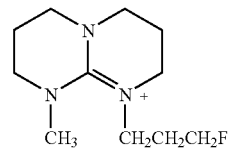

1-methyl-7-n-3-fluoropropyl-1,5,7-triazabicyclo[4.4.0]dec-5-enium

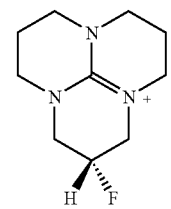

The asymmetric guanidinium cation forms an ambient temperature molten salt with an anion, preferably a partially or fully halogenated anion. Preferably the halogen of the guanidinium cation and that of the anion are the same.

An exemplary anion is bis-trifluoromethanesulfonyl imide. This anion is itself capable of assuming five resonant hybrid structures, as indicated below.

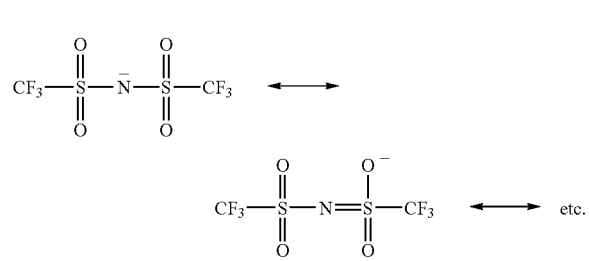

bis-trifluoromethanesulfonyl imide

When this anion is combined with a cation of the present invention, for example N,N,N',N'-tetramethyl-N",N"-di-2-fluoroethylguanidinium, the product tetramethyl-di-2-fluoroethylguanidinium bis-trifluoromethanesulfonyl imide is liquid at ambient temperature and only slightly soluble in water. Being liquid at ambient temperature means that the electrolyte is in a liquid phase at a temperature of about 60° C., or less.

One convenient method of preparing tetramethylguanidinium bis-trifluoromethanesulfonyl imide is by reacting two aqueous salt solutions, one containing tetramethylguanidine hydrochloride, and the other containing lithium bis-trifluoromethanesulfonyl imide. The resulting ambient temperature molten salt is only slightly soluble in water, and can be separated and dried. A lithium salt added to the dried molten salt is preferred for electrochemical cells having lithium as the anode active material.

Besides bis-trifluoromethanesulfonyl imide, anions useful in conjunction with a guanidinium cation include $PF_6^-$, $BF_4^-$, and triflate ($CF_3SO_3^-$). Preferred are lithium salts mixed with these ambient temperature molten salts. Other lithium salts useful with the guanidinium cation include lithium salts of: $AsF_6^-$, $SbF_6^-$, $ClO_4^-$, $O_2^-$, $AlCl_4^-$, $GaCl_4^-$, $C(SO_2CF_3)_3^-$, $N(SO_2CF_3)_2^-$, $SCN^-$, $O_3SCF_3^-$, $C_6F_5SO_3^-$, $O_2CCF_3^-$, $SO_6F^-$, $B(C_6H_5)_4^-$, and mixtures thereof.

Also useful as anions are asymmetric derivatives of bis-trifluoromethanesulfonyl imide, such as trifluoromethanesulfonyltrifluoroacetyl imide and trifluoromethanesulfonylpentafluoroethanesulfonyl imide.

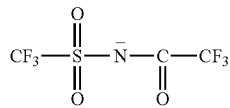

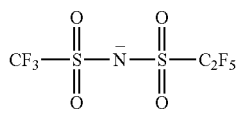

Trifluoromethanesulfonyltrifluoroacetyl imide
Trifluoromethanesulfonylpentafluoroethanesulfonyl imide Other useful halogenated anions include any having extensive delocalization of the negative charge, such as halogenated derivatives of closocarborates: $B_9H_9CH^-$, $B_{11}H_{11}CH^-$, and closoborates: $B_{10}H_{10}^{2-}$ and $B_{12}H_{12}^{2-}$.

If a single-phase gel electrolyte is preferred, the product guanidine derivative molten salt is mixed with a unsaturated monomer. Suitable polymerizerable monomers have at least one α-unsaturated functionality, and more preferably multiple α-unsaturated functionalities, such as multi-functional (meth)acrylates so that they are relatively rapidly curable inside a cell casing to form a cross-linked matrix or network. Preferably, the (methyl)acryloyl monomer has at least one functional group selected from the group consisting of alkyl, alkyl ether, alkoxylated alkyl and alkoxylated phenol functional groups. Suitable monomers include dipentaerythritol hexaacrylate (DPHA), dipentaerythritol pentaacrylate (DPAA), pentaerythritol tetraacrylate, ethoxylated pentaerythritol tetraacrylate, di(trimethylolpropane) tetraacrylate (DTMPTA), trimethylolpropane trimethacrylate, ethoxylated trimethylolpropane triacrylate (ETMPTA), ethoxylated bisphenol diacrylate, hexanediol diacrylate, and mixtures thereof. For more detail regarding gel electrolytes, reference is drawn to U.S. Patent Application Pub. No. 2003/0104282, abandoned. This application is assigned to the assignee of the present invention and incorporated herein by reference.

The present ambient temperature molten salts are useful as electrolytes in a wide variety of electrochemical power sources. These include primary electrochemical cells, such as of the lithium/silver vanadium oxide couple (Li/SVO), Li/copper silver vanadium oxide (Li/CSVO), and lithium/manganese oxide ($Li/MnO_2$). Exemplary Li/SVO cells are described in U.S. Pat. Nos. 4,310,609 and 4,391,729, both to Liang et al., and 5,580,859 to Takeuchi et al. while an exemplary Li/CSVO cell is described in U.S. Pat. Nos. 5,472,810 and 5,516,340, both to Takeuchi et al. All of these patents are assigned to the assignee of the present invention and incorporated herein by reference.

The ambient temperature molten salts of the present invention are also useful for activating secondary electrochemical cells. In a secondary system, the negative electrode comprises a material capable of intercalating and de-intercalating the active material, such as the preferred alkali metal lithium. A carbonaceous negative electrode comprising any of the various forms of carbon (e.g., coke, graphite, acetylene black, carbon black, glass carbon, "hairy carbon" etc.) that are capable of reversibly retaining the lithium species is preferred for the negative electrode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes that are capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The present ambient temperature molten salts are not only useful as electrolytes in primary and secondary electrochemical cells; they are useful in capacitors as well. This includes conventional electrolytic capacitors, as well as those of an electrolytic/electrochemical hybrid type. Capacitor cathodes commonly used in electrolytic capacitors include etched aluminum foil in aluminum electrolytic capacitors, and those commonly used in wet tantalum capacitors such as of silver, sintered valve metal powders, platinum black, and carbon. The cathode of hybrid capacitors include a pseudocapacitive coating of a transition metal oxide, nitride, carbide or carbon nitride, the transition metal being selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel. The pseudocapacitive coating is deposited on a conductive substrate such as of titanium or tantalum. The electrolytic/electrochemical hybrid capacitor has high energy density and is particularly useful for implantable medical devices such as a cardiac defibrillator.

The anode is of a valve metal consisting of the group vanadium, niobium, tantalum, aluminum, titanium, zirconium and hafnium. The anode can be a foil, etched foil, sintered powder, or any other form of porous substrate of these metals.

A preferred chemistry for a hybrid capacitor comprises a cathode electrode of a porous ruthenium oxide film provided on a titanium substrate coupled with an anode of a sintered tantalum powder pressed into a pellet. A suitable separator material impregnated with the present working electrolyte segregates the cathode and anode electrodes from each other. Such a capacitor is described in U.S. Pat. Nos. 5,894,403 to Shah et al., 5,920,455 to Shah et al. and 5,926,362 to Muffoletto et al. These patents are assigned to the assignee of the present invention and incorporated herein by reference.

The following example describes the preparation of an ambient temperature salt according to the present invention, and it sets forth the best mode contemplated by the inventors of carrying out the invention, but it is not to be construed as limiting.

EXAMPLE

Tetramethylguanidinium bis-trifluoromethanesulfonyl imide was prepared as follows. 7.1 milliliters of tetramethyl guanidine (6.54 grams; 57 mmoles) was dissolved in about 25 milliliters of water. Five milliliters (60 mmoles) of concentrated (12 molar) hydrochloric acid was slowly added to this solution with stirring. In a separate vessel, 16.3 grams (57 mmoles) of lithium bis-trifluoromethanesulfonyl imide was dissolved in about 25 milliliters of water. Both solutions were added to a 125 milliliters separatory funnel and agitated. The mixture was allowed to separate, and the denser molten salt was drawn off the bottom. The molten salt was washed twice in the separatory funnel with two 25 milliliters portions of water. This produced about 13 milliliters (19 grams) of tetramethylguanidinium bis-trifluoromethanesulfonyl imide as a crystal clear, colorless liquid. The yield was about 85%.

It is appreciated that various modifications to the inventive concepts described herein may be apparent to those of ordinary skill in the art without departing from the scope of the present invention as defined by the herein appended claims.

What is claimed is:

1. An electrolyte for an electrochemical cell, the electrolyte comprising:
    a) a guanidine cation having the general formula $C(NR_2)_3^+$, wherein one or two, but not all three, of the N atoms are bonded to R radicals that are the same for each thusly substituted N atom and the third N atom is bonded to hydrogen or two of the same R radicals, and if R radicals, they are different than the R radicals bonded to the first and second N atoms, and wherein the R radicals bonded to any one N atom are an alkyl group of from 1 to 4 carbon atoms, and wherein either both of the hydrogen atoms or at least one of the hydrogen atoms on each of the R radicals bonded to one or two, but not three, of the N atoms are substituted with the same halogen selected from the group consisting of fluorine, chlorine, bromine, and iodine;
    b) an anion; and
    c) a lithium salt dissolved therein.

2. The electrolyte of claim 1 wherein the alkyl group is selected from the group consisting of ethyl, propyl, isopropyl, butyl, isobutyl, sec-butyl, and tert-butyl.

3. The electrolyte of claim 1 wherein the guanidine cation is part of a heterocyclic group.

4. The electrolyte of claim 3 wherein the heterocyclic group is of one, two, or three heterocyclic rings.

5. The electrolyte of claim 1 wherein the anion is from a dissociated salt selected from the group consisting of lithium bis-trifluoromethanesulfonyl imide, lithium trifluoromethanesulfonyltrifluoroacetyl imide, lithium trifluoromethanesulfonylpentafluoroethanesulfonyl imide, $LiPF_6$, $LiBF_4$, $Li(CF_3SO_3^-)$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, lithium closocarborates, lithium closoborates, lithium halogenated closocarborates, lithium halogenated closoborates, and mixtures thereof.

6. The electrolyte of claim 1 as a liquid phase at about 60° C., or less.

7. An electrochemical cell, which comprises:
    a) a negative electrode of either lithium or having a material capable of intercalating and de-intercalating lithium;
    b) a positive electrode comprising a cathode active material capable of intercalating lithium or capable of intercalating and de-intercalating lithium;
    c) a separator disposed between the negative and positive electrodes to prevent direct physical contact between them;
    d) an electrolyte activating the negative and the positive electrode, the electrolyte comprising:
        i) a guanidine cation having the general formula $C(NR_2)_3^+$, wherein one or two, but not all three, of the N atoms are bonded to R radicals that are the same for each thusly substituted N atom and the third N atom is bonded to hydrogen or two of the same R radicals, and if R radicals, they are different than the R radicals bonded to the first and second N atoms, and wherein the R radicals bonded to any one N atom are an alkyl group of from 1 to 4 carbon atoms, and wherein either both of the hydrogen atoms or at least one of the hydrogen atoms on each of the R radicals bonded to one or two, but not three, of the N atoms are substituted with the same halogen selected from the group consisting of fluorine, chlorine, bromine, and iodine;
        ii) an anion; and
        iii) a lithium salt dissolved therein; and
    e) a casing housing the negative and positive electrodes activated by the electrolyte.

8. The electrochemical cell of claim 7 wherein the alkyl group is selected from the group consisting of ethyl, propyl, isopropyl, butyl, isobutyl, sec-butyl, and tert-butyl.

9. The electrochemical cell of claim 7 wherein the guanidine cation is part of a heterocyclic group.

10. The electrochemical cell of claim 9 wherein the heterocyclic group has one, two, or three rings.

11. The electrochemical cell of claim 7 wherein the anion is from a dissociated salt selected from the group consisting of lithium bis-trifluoromethanesulfonyl imide, lithium trifluoromethanesulfonyltrifluoroacetyl imide, lithium trifluoromethanesulfonylpentafluoroethanesulfonyl imide, $LiPF_6$, $LiBF_4$, $Li(CF_3SO_3^-)$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, lithium closocarborates, lithium closoborates, lithium halogenated closocarborates, lithium halogenated closoborates, and mixtures thereof.

12. The electrochemical cell of claim 7 wherein the electrolyte is a liquid phase at about 60° C., or less.

13. The electrochemical cell of claim 7 wherein the electrolyte is a gel electrolyte and includes an unsaturated monomer selected from the group consisting of dipentaerythritol hexaacrylate (DPHA), dipentaerythritol pentaacrylate (DPAA), pentaerythritol tetraacrylate, ethoxylated pentaerythritol tetraacrylate, di(trimethylolpropane) tetraacrylate (DTMPTA), trimethylolpropane trimethacrylate, ethoxylated trimethylolpropane triacrylate (ETMPTA), ethoxylated bisphenol diacrylate, hexanediol diacrylate, and mixtures thereof.

14. The electrolyte of claim 1 as a gel electrolyte including an unsaturated monomer selected from the group consisting of dipentaerythritol hexaacrylate (DPHA), dipentaerythritol pentaacrylate (DPAA), pentaerythritol tetraacrylate, ethoxylated pentaerythritol tetraacrylate, di(trimethylolpropane) tetraacrylate (DTMPTA), trimethylolpropane trimethacrylate, ethoxylated trimethylolpropane triacrylate (ETMPTA), ethoxylated bisphenol diacrylate, hexanediol diacrylate, and mixtures thereof.

15. The electrolyte of claim 1 wherein the anion is either a partially or fully halogenated anion.

16. The electrolyte of claim 15 wherein the halogen of the guanidinium cation and that of the anion are the same.

17. The electrochemical cell of claim 7 wherein the anion is either a partially or fully halogenated anion.

18. The electrochemical cell of claim 17 wherein the halogen of the guanidinium cation and that of the anion are the same.

19. An electrolyte for an electrochemical cell, the electrolyte comprising:
 a) a guanidine cation having the general formula $C(NR_2)_3^+$, wherein one or two, but not all three, of the N atoms are bonded to R radicals that are the same for each thusly substituted N atom and the third N atom is bonded to hydrogen or two of the same R radicals, and if R radicals, they are different than the R radicals bonded to the first and second N atoms, and wherein the R radicals bonded to any one N atom are an alkyl group of from 1 to 4 carbon atoms, and wherein either both of the hydrogen atoms or at least one of the hydrogen atoms on each of the R radicals bonded to one or two, but not three, of the N atoms are substituted with the same halogen selected from the group consisting of fluorine, chlorine, bromine, and iodine;
 b) an anion that is either partially or fully halogenated anion, wherein the halogen of the guanidinium cation and that of the anion are the same; and
 c) a lithium salt dissolved therein.

20. The electrolyte of claim 19 as a gel electrolyte including an unsaturated monomer selected from the group consisting of dipentaerythritol hexaacrylate (DPHA), dipentaerythritol pentaacrylate (DPAA), pentaerythritol tetraacrylate, ethoxylated pentaerythritol tetraacrylate, di(trimethylolpropane) tetraacrylate (DTMPTA), trimethylolpropane trimethacrylate, ethoxylated trimethylolpropane triacrylate (ETMPTA), ethoxylated bisphenol diacrylate, hexanediol diacrylate, and mixtures thereof.

* * * * *